United States Patent

[11] 3,537,557

| [72] | Inventor | Gordon C. Olson<br>Rockford, Illinois |
|---|---|---|
| [21] | Appl. No. | 784,627 |
| [22] | Filed | Dec. 18, 1968 |
| [45] | Patented | Nov. 3, 1970 |
| [73] | Assignee | Twin Disc Incorporated<br>Racine, Wisconsin<br>a corporation of Wisconsin |

[54] HYDRAULICALLY ACTUATED CLUTCH HAVING A FEEDBACK DUMP VALVE
2 Claims, 4 Drawing Figs.

| [52] | U.S. Cl. | 192/106,<br>192/104, 137/54 |
|---|---|---|
| [51] | Int. Cl. | F16d 43/04 |
| [50] | Field of Search | 192/103(F-1),<br>104(F), 106(F), 85, 85(A), 85(A-2), 87.12 |

[56] References Cited
UNITED STATES PATENTS

| 2,297,480 | 9/1942 | Kratzmann | 192/104(F)UX |
|---|---|---|---|
| 2,588,724 | 3/1952 | Hobbs et al. | 192/106(F)UX |
| 2,864,479 | 12/1958 | Schindler | 192/85(A—2)UX |
| 3,094,203 | 6/1963 | Jania et al. | 192/85(A—2)UX |

Primary Examiner—Benjamin W. Wyche
Attorney—James E. Nilles

ABSTRACT: A hydraulically actuated friction clutch having a valve in the fluid inlet to the actuating chamber, which valve balances the head due to centrifugal force of that supply fluid located in the rotating supply passage, assuring positive disengagement, a fluid feedback system making actuation of the clutch directly responsive to the actual control pressure and uninfluenced by centrifugal head of the fluid supply column. The valve is so constructed and arranged that when the actuating pressure to shut off to release the clutch, the feedback of fluid from the clutch actuating chamber causes rapid and complete dumping of fluid from the actuating chamber.

Patented Nov. 3, 1970

3,537,557

INVENTOR:
GORDON C. OLSON
BY: James E. Nilles
ATTORNEY and is directed radially outward where it enters the expansible fluid chamber formed by the cylinder and piston. This forms, in general, a radially extending column of fluid which is subjected to centrifugal force and develops a considerable head acting on the piston, over and above any control pressure applied to the fluid. In order to compensate for or balance this centrifugal head of the column of fluid, attempts have been made to solve this problem by the use of centrifugally operated valves such as shown in the U.S. Pats. to C.R. Hilpert, Nos. 3,368,656 of Feb. 13, 1968, or 3,358,796 of Dec. 19, 1967. These devices worked very satisfactorily for their intended purposes.

SUMMARY OF THE INVENTION

The present invention provides a hydraulically actuated friction clutch having a centrifugally shiftable valve of a T-shape which not only compensates for the head set up by the rotating column of supply fluid, but in addition permits the actuating chamber to be dumped extremely rapidly when the supply of actuating fluid pressure is shut off. More specifically the T-shape valve has a hollow stem or leg and although the valve is located compactly radially within the outer diameter of the clutch actuating piston, nevertheless it is capable of completely dumping the chamber at the outside diameter of the chamber. The arrangement is such that the fluid being expelled from the chamber acts in a "feedback" fashion, and under centrifugal force it forcibly acts on the dump valve to urge it rapidly in a radial outer, fluid dumping direction. Thus, centrifugal force on the valve together with the force of the fluid being dumped both act to insure rapid exhaust of the actuating chamber.

DESCRIPTION OF A PREFERRED EMBODIMENT

Figure 1:
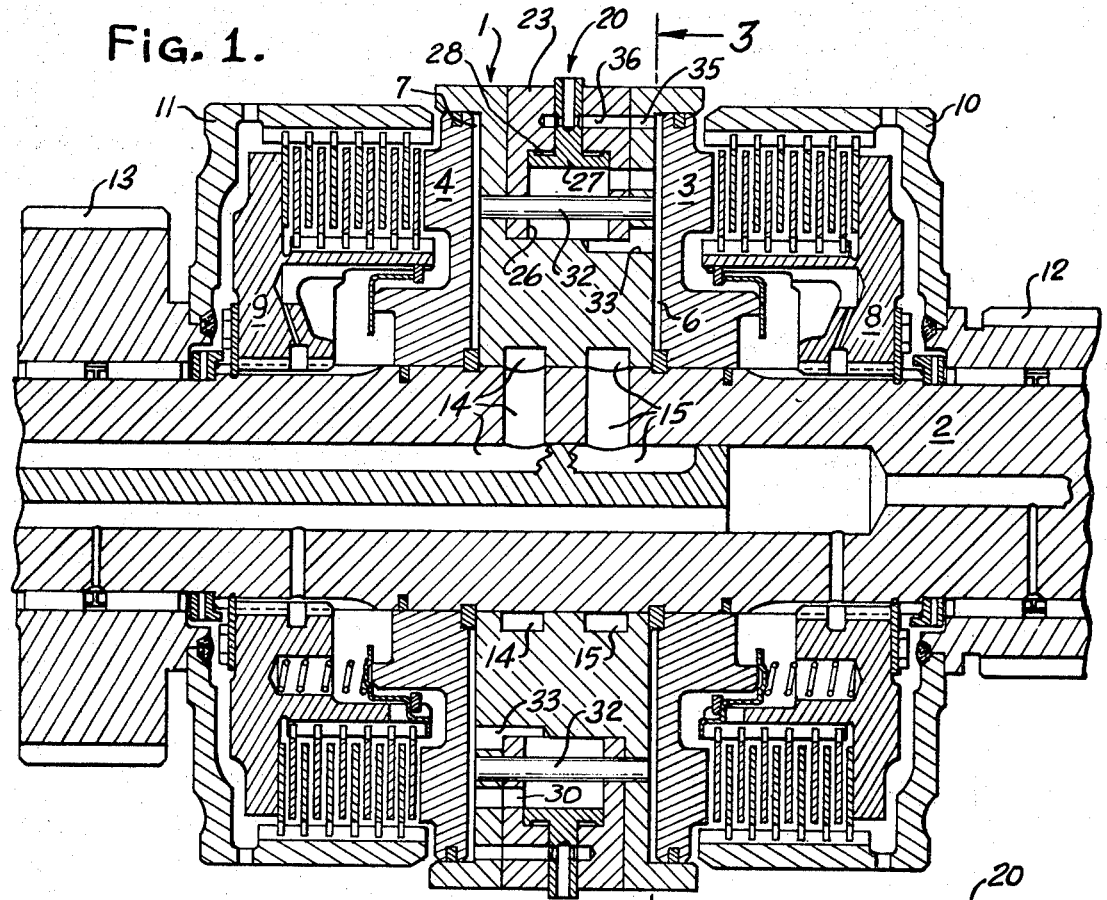
FIG. 1 is a longitudinal, cross-sectional view through a clutch made in accordance with the present invention; and showing the clutch when released during operational conditions.
Figure 3:
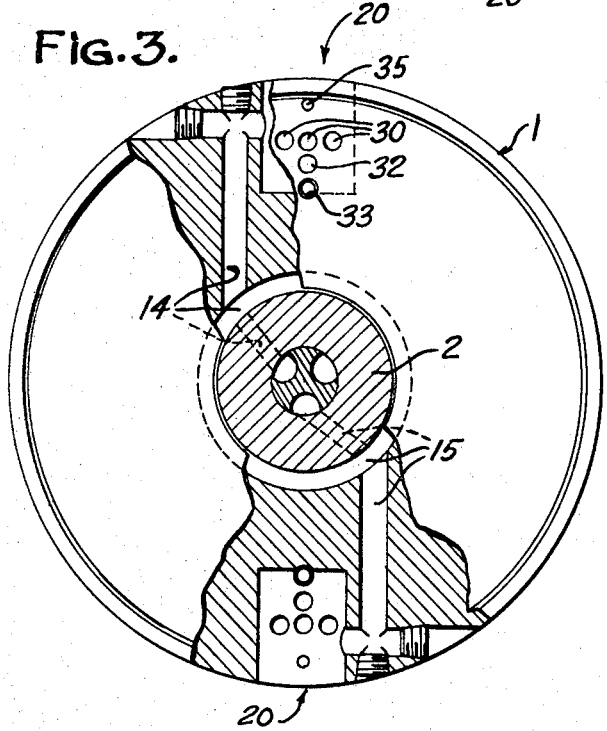
FIG. 3 is a cross-sectional view taken along line 3–3 in FIG. 2, parts shown as being broken away for clarity in the drawing.

The invention has been shown as applied to a duplex clutch but, of course, it can be used with a single clutch. The duplex clutch includes a central reaction member 1 which is fixed on a shaft 2, and a pair of pistons 3 and 4 are slidable on the shaft, one on each side of the central reaction member defining therewith the actuating chambers 6 and 7. Hub members 8 and 9 are fixed to the shaft by their respective splines. Drums 10 and 11 are provided respectively for the hubs 8 and 9 by means of conventional interleaved clutch plates between the hub 8 and its drum 10 and similarly between hub 9 and its drum 11. The drums 10 and 11 each have a gear 12 and 13, respectively, fixed therewith, and the drums and their respective gears rotate freely on the shaft 2 when the clutch is not engaged. Clamp up of the clutch plates causes rotation of corresponding gear with the shaft in the known manner.

Supply passage means 14 and 15 are connected to individual pressure holes or insert compartments in shaft 1, then are radially drilled through the reaction member to conduct fluid pressure respectively to the actuating chambers 6 and 7. The actuating chambers 6 and 7 are selectively pressurized to cause extension of the piston and clamp up of its adjacent clutch pack.

A valve 20 is provided in the rotatable member 1 for each of the actuating chambers 6 and 7, and as they are identical, only one of the valves will be described in detail.

The valves 20 are generally T-shaped in form and the leg 21 of the valve is generally hollow. An exhaust cross port 22 extends through the leg and is in communication with the interior of the hollow leg 21. The rotatable member has a sleeve 23 fixed therein, and this sleeve has a generally radially extending outer small hole 25 in which the leg slides, and also has a counterbore 26 which provides a supply chamber 28 with the valve 20. The reaction member 1 and sleeve 23 may be considered as a single piece. Thus the enlarged head 27 of the valve, together with the bore in the rotatable member provides a supply chamber 28 into which pressure fluid is admitted from the supply passage means 14 and 15. The sleeve 23 and rotatable member 1 also have axially extending feed ports 30 which conducts fluid from the supply chamber 28 to the actuating chamber 6 which is to be pressurized. A dowel pin 32 extending through the rotatable member 1 insures that the valve 20 does not fall out in a radial inward direction. Member 1 also has a feedback port 33 which places the actuating chamber 6 in fluid communication with the radially inner surface of the T-shaped valve 20 as will appear.

It will also be noted that a discharge port 35 is located at the extreme outer diameter of the actuating chambers 6 and 7. This discharge port 35 places the clutch actuating chamber 6 in fluid dumping communication with the hollow leg 21 of the T-shaped valve, when the latter is in the radially outer, dumping position, as shown in FIG. 1.

Figure 2:
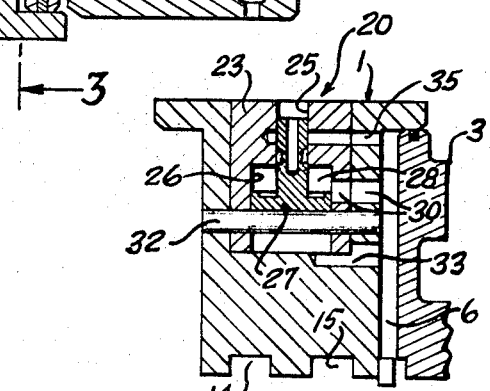
FIG. 2 is a view similar to a portion of FIG. 1, but showing the valve position for clutch engagement.
Figure 4:
FIG. 4 is an elevational view of the shiftable valve element shown in FIGS. 1 and 2, but on an enlarged scale.

When the valve is in the radially inward position, (FIG. 2) as for example when the supply passage 14 is pressurized, fluid is directed via passage means 14 and into the chamber 28, ports 30 and then into the actuating chamber 6 to cause clutch engagement. At this time, the discharge port 35 is blocked by the leg 21 of the valve, (FIG. 2).

The weight of the T-shaped valve is such that it counterbalances the weight of the fluid that extends from the central rifle drilling in the shaft 2 outwardly to the valve 20. In other words, such a column of fluid creates a considerable head, due to centrifugal force of the rotating clutch, and this head is counter-balanced by the weight of the T-shaped valve. In this manner, feedback return of the valve to the clutch dumped position is assured.

After the clutch has been actuated and it is desired to release it, the fluid supply pressure is cut off form the associated supply passage. The pressure in cavity 28 is dropped to zero immediately and the fluid is allowed to exhaust. Centrifugal force created by the weight of valve 20 and the fluid behind area 27 moves the valve 20 outwardly to the FIG. 1 position. The action of the centrifugal head of the fluid in the actuating chamber and a feedback system including port 33, acts to eliminate the centrifugal effects and thereby establishes only control pressure of the fluid in the actuating chamber 6. Thereby the clutch can be designed to handle the load requirement accordingly. The feedback action of the fluid in the actuating chamber also aids the centrifugal force acting on the valve, to thereby cause rapid outward movement of the valve to the dumped position, (FIG. 1).

When in the outer dumping position, the exhaust cross port 22 in the valve stem 21 is aligned with the discharge port 35 located at the outer diameter of the actuating chamber, permitting the actuating chamber to be quickly and completely dumped through the hollow valve stem.

I claim:

1. A hydraulically actuated friction clutch mechanism of the type having a rotatable member which together with a slidable piston defines an expansible clutch actuating chamber that is pressurizable to cause clutch engagement, said member having a generally radially extending hole therein and also having a counterbore concentric with said hole and located radially inwardly of said hole, a T-shaped valve having a generally hollow leg slidable in said hole, said leg having an exhaust cross port therein and in communication with the interior of said hollow leg, said valve also having an enlarged head which is slidable in said counterbore and defining a fluid supply chamber therewith, fluid supply passage means in said member and in fluid delivering communication with said supply chamber, a feed port in said member and extending from said supply chamber to said actuating chamber and open when said passage means is pressurized thereby urging said valve to a radially inner position to permit pressure fluid in said supply passage to enter and expand said actuating chamber; said member also having a feed back port extending form said actuating chamber to the radially inner end of said valve, and when said fluid supply passage means is not pressurized, said valve is shifted radially outwardly due to centrifugal force and also due to fluid in said actuating chamber feeding back through said feed back port and acting on the radially inner side of said valve, said rotatable member also having a discharge port extending from adjacent the outer diameter of said actuating chamber and alignable with said exhaust cross port of said valve leg when said valve is shifted to said radially outward position, whereby fluid in said actuating chamber can then be dumped quickly and completely through said member discharge port and said hollow leg.

2. A hydraulically actuated friction clutch mechanism of the type having a rotatable member which together with a slidable piston defines an expansible clutch actuating chamber that is pressurizable to cause clutch engagement, said member having a generally radially extending hole therein and also having a counterbore concentric with said hole and located radially inwardly of said hole, a T-shaped valve having a generally hollow leg slidable in said hole, said leg having an exhaust cross port therein and in communication with the interior of said hollow leg, said valve also having an enlarged head which is slidable in said counterbore and defining a fluid supply chamber therewith, fluid supply passage means in said member and in fluid delivering communication with said supply chamber, a feed port to said actuating chamber and urging said valve to a radially inner position to permit pressure fluid in said supply passage to enter and expand said actuating chamber; a feedback port extending from said actuating chamber to the radially inner end of said valve, said rotatable member also having a discharge port extending from said actuating chamber and alignable with said exhaust cross port of said valve leg when said valve is shifted to a radially outward position, whereby fluid in said actuating chamber can then be dumped quickly and completely through said member discharge port and said hollow leg.